United States Patent Office 3,253,954
Patented May 31, 1966

3,253,954
RETAINING MEMBER FOR STORAGE BATTERY ELECTRODES
Henry J. Banas, Columbia Heights, Minn., assignor to Gould-National Batteries, Inc., a corporation of Delaware
No Drawing. Filed Aug. 13, 1963, Ser. No. 301,908
9 Claims. (Cl. 136—54)

This invention relates to improvements in the fabrication of flat plate positive electrodes for use in lead-acid storage batteries.

Heretofore the battery industry has been beset with the problem of the loss of active material from the flat plate positive electrodes in the lead-acid secondary storage batteries during normal use. This loss has decreased the life expectancy and capacity of the battery. Various attempts have been made to solve this problem by encasing the electrode with some material such as felted fibers of a synthetic nature, plastic sheeting, glass mats and the like, with no great degree of success in solving the problem. For example, glass mats have been bonded to the electrode with cement but besides adding a lengthy and costly operation in the fabrication of the battery electrodes, there has resulted increased bulk and with accompanying reduction in the capacity of the battery. In other instances the electrodes have been inserted into pockets of materials of the nature referred to above but these have been ineffective to reliably prevent the loss of the active material since spacing between the pocket structure and the electrode are sufficient to allow a quantity of the active material to leave the electrode. Where attempts have been made to insert the plate anode snugly into a receptacle of a material having a porosity of a sufficient degree to prevent disassociation of the active material from the electrode, these attempts have generally resulted in a higher internal resistance similar to that effected by the use of glass mats. When the porosity of the material utilized in such a manner has been increased in an attempt to decrease the internal resistance, there has resulted losses of the active material from the electrode.

A further problem has been encountered when utilizing previous methods for retaining the active material on the electrode. When the electrodes are initially formed, a surface material of fine particles is developed during the formation. This material had to be washed out prior to the application of these previously known retainer materials. If this were not done, this surface material plugged up the porous areas and resulted in an increased internal resistance.

It is, therefore, a general object of this invention to provide an improvement in retaining active materials on a flat plate electrode in a lead-acid storage battery during normal use.

It is a more specific object of this invention to provide increased life expectancy of the flat positive electrodes used in lead-acid battery cells.

Still a further object of this invention is to achieve the immediately foregoing object with substantially no increase in the internal resistance of the battery electrode.

Yet another object of this invention is to increase the life expectancy of the plate-like positive electrodes in a lead-acid storage battery under normal use with no substantial loss in the battery capacity.

Still another object of this invention is to provide a method for applying material to a plate-like positive electrode for use in a lead-acid storage battery for retaining the active materials to the electrode during its normal use while still permitting the very fine surface materials produced during formation of the plates to wash out.

Yet another object of this invention is to achieve the foregoing objects using an economical process with no substantial increase in the bulk of the electrode.

These and other objects and features of this invention will be pointed out in the course of the following detailed description.

In lead-acid secondary storage batteries the positive electrode of lead dioxide is generally in the shape of a plate-like member having a generally rectangular cross section to effect a maximum surface exposure when immersed in the electrolyte acid. Methods for forming the basic lead dioxide plates are well known in the art and are not considered part of this invention. During the formation process using any of the well known methods, very fine particles develop on the surface of the plate. Previously, this material had to be removed by additional washing prior to inserting the electrode into the retainer to ensure that this readily removable very fine surface material did not clog the porous areas of the retainer and thereby increase the internal resistance of the plates.

During discharge and charge of the battery under normal use conditions, the chemical reactions within the battery cells tend to cause disassociation of some of the active materials from the plate electrode which results in lower life expectancy and reduced capacity of the battery. This invention obviates the foregoing difficulties by encasing the plate electrode in a material which is inert with respect to the acidic electrolyte in a manner such that the active material is retained to the electrode during normal use but yet which permits the very fine particles of surface materials which are developed during the formation process to wash out without clogging the porous areas. Preferably the material used is Dynel which is a synthetic fiber made by the copolymerization of 40% acrylonitrile and 60% vinyl chloride. Porous sheets of Dynel material are woven from the fibers and are readily available commercially.

As contemplated by this invention, a sheet of Dynel material is formed into a bag or envelope closed on three sides, the envelope having the general rectangular configuration of the battery plate. The plate electrode is then inserted into the pocket formed by the Dynel envelope and then the opening through which the plate is inserted is closed by any convenient method, for example, by heat sealing, adhesive or by sewing. The entire assembly is then subjected to a predetermined temperature for a predetermined period of time. The woven Dynel material is characterized by its tendency to shrink when subjected to increased temperature. This characteristic has been explained briefly by suggesting that when the Dynel fibers are initially formed the fibers are stretched and since Dynel is a plastic material it has a plastic memory so that upon subsequent heating the fibers tend to return to their original unstretched state. The shrinkage of Dynel material causes it to come into intimate contact with all areas of the plate electrode thereby applying forces inwardly upon the electrode surfaces distributed over the entire surface area. The time and temperature limits to effect the desired shrinkage has been found to range from 270° F. for approximately eighteen minutes to 380° F. for approximately three minutes. In a typical case, an extremely satisfactory result has been achieved by heating at a temperature of 362° F. for six and one-half minutes. It should be recognized that excessive temperature, or heating for an excessive period of time, or a combination of both, can result in a tearing of the enveloping Dynel material and a subsequent deficiency in the retaining strength. After the Dynel has been fitted to the plate, as described above, the permeability or porosity of the Dynel material in the shrunken condition on the plate is such that the very fine surface particles are readily removed from the surface of the plate without blocking up any of the porous areas of the retainer. This prevents unduly high internal resistance from developing in the plate faces. At the same time, the forces acting on the plate surfaces by the Dynel material are of a nature to prevent active material from disassociating from the electrode during normal use within a battery.

It should be noted as a further feature of this invention that the Dynel material need not be preformed, by molding or heat treating or the like, to an accurately dimensioned configuration conforming to that of the plate since the shrinking during the heat treating process while the plate is inserted in the Dynel envelope results in the desired encasing configuration. The plate itself serves as the form.

Some of the further characteristics of Dynel, which is the preferable material used in this invention, will now be pointed out. It is chemically inert with respect to the acidic electrolyte used in the battery. It is a woven material having a thread count ranging from 68 x 65 to 38 x 31 and corresponding permeability or porosity, as measured by the Frazier method (see U.S. Department of Commerce, National Bureau of Standards Research Paper R.P. 1471, part of Journal of Research of the National Bureau of Standards, Volume 28, May 1942, pages 637–642, "Improved Instrument for Measuring the Air Permeability of Fabrics" by Herbert F. Schiefer and Paul M. Boyland) at one-half inch water pressure drop, ranging from 20 to 68 cubic feet per square foot per minute before shrinkage. After shrinkage the permeability correspondingly ranges from 30 to 87 cubic feet per square foot per minute. At first blush it would appear that there is an inconsistency in that the permeability is greater after shrinkage than before. This has been explained by suggesting that initially the fibers tend to shrink in length but since the fibers are continuous around the plate, the shrinkage in length is limited. Further tendency to shrink the fibers which have no loose ends, results in a decrease of the width or diameter of the fibers creating larger porous areas between fibers. A further characteristic of the Dynel material which provides an additional feature of this invention is that after it has been shrunk to tightly encapsulate the plate, it still is susceptible to additional stretching without deterioration. As the plate has a tendency to expand with age under normal use conditions, the Dynel material will stretch, to a limited degree, in conformance with the plate enlargement while still preventing the active material from disassociating from the plate.

It is within contemplation of this invention that other fiber materials can be woven into sheets and utilized as the retaining member. An example of another material is Kanekalon, a product of Kanegafuchi Chemical Industry Company. This material is a vinyl chloride acrylonitrile copolymer similar to Dynel and has characteristics very similar to those of Dynel. A further material can be woven from fibers of polypropylene which has properties substantially similar to those of Dynel.

It should be pointed out that the retaining material formed to the surface of the plate as taught by this invention in no way acts as an insulating separator between plates. In its shrunken state conforming tightly to the configuration of the plate member, the retaining material adds negligible bulk to the plate and provides an economical solution to a long-standing problem in the battery industry.

I claim:

1. In the manufacture of a battery plate carrying active material and having flat parallel faces for use in constructing lead-acid batteries out of multiple plates and separators, the method of confining active material on said plate which comprises, enclosing the plate in a relatively loosely fitting envelope formed from woven acid-resistant, heat-shrinkable synthetic fibers, and subjecting the entire envelope while containing said plate to a temperature sufficient to shrink said envelope so that the surrounding fabric fibers fit tightly to the plate to prevent active material from separating from the plate.

2. A method in accordance with claim 1 in which the fabric has permeability as measured by the Frazier method at ½ inch water pressure drop within the range 20–68 cubic feet per minute per square foot and thread count in the range of 68 x 65 to 38 x 31.

3. A method in accordance with claim 1 in which said fabric has permeability as measured by the Frazier method at ½ inch water pressure drop within the range of 30 to 87 c.f.m. per square foot after shrinkage.

4. A method in accordance with claim 1 in which said fabric is woven from Dynel fibers and has a permeability at ½ inch water pressure drop per square foot within the range of 20 c.f.m. to 69 c.f.m. before shrinkage.

5. A method in accordance with claim 3 wherein said fibers are Dynel.

6. A method in accordance with claim 4 wherein the enveloped plate is subjected to a predetermined temperature for a predetermined period of time such that the permeability of the fabric is changed to range from 30 to 87 c.f.m. per square foot after shrinkage.

7. A method in accordance with claim 1 wherein the envelope is formed by a material woven from vinyl chloride-acrylonitrile copolymer fibers.

8. The method in accordance with claim 7 in which said said fabric has a permeability as measured by the Frazier method at ½ inch water pressure drop within the range of 30 to 87 c.f.m. per square foot after shrinkage.

9. In the manufacture of a battery plate carrying active material and having flat parallel faces for use in constructing lead-acid batteries with multiple plates and separators, the method of retaining the active material on said plate comprising the steps of:
   (a) enclosing the plate in a relatively loosely fitting envelope formed by a material woven from vinyl chloride-acrylonitrile copolymer fibers having an initial permeability, as measured by the Frazier method, at ½ inch water pressure drop in the range of 20–68 c.f.m. per square foot; and
   (b) shrinking the envelope so that it has increased permeability and its plate-encircling fibers fit tightly to the plate to prevent active material from leaving the plate by subjecting the envelope while containing the plate to a predetermined temperature for a corresponding predetermined period of time ranging from 270° F. for 18 minutes to 380° F. for three minutes thereby changing the porosity to a range of 30 to 87 c.f.m. per square foot.

References Cited by the Examiner

UNITED STATES PATENTS

| | | | |
|---|---|---|---|
| 2,866,841 | 12/1958 | Zahn | 136—147 |
| 3,056,171 | 10/1962 | Fite. | |
| 3,147,150 | 9/1964 | Mendelsohn et al. | 136—146 |

WINSTON A. DOUGLAS, *Primary Examiner.*

A. SKAPARS, *Assistant Examiner.*